US011669751B2

(12) United States Patent
Kanza et al.

(10) Patent No.: US 11,669,751 B2
(45) Date of Patent: Jun. 6, 2023

(54) PREDICTION OF NETWORK EVENTS VIA RULE SET REPRESENTATIONS OF MACHINE LEARNING MODELS

(71) Applicants: AT&T Intellectual Property I, L.P., Atlanta, GA (US); University of Southern California, Los Angeles, CA (US); President and Fellows of Harvard College, Cambridge, MA (US)

(72) Inventors: Yaron Kanza, Fair Lawn, NJ (US); Balachander Krishnamurthy, New York, NY (US); Sivaramakrishnan Ramanathan, Allston, MA (US); Minian Yu, Belmont, MA (US); Jelena Mirkovic, Redondo Beach, CA (US)

(73) Assignees: AT&T Intellectual Property I, L.P., Atlanta, GA (US); PRESIDENT AND FELLOWS OF HARVARD COLLEGE, Cambridge, MA (US); UNIVERSITY OF SOUTHER CALIFORNIA, Los Angeles, CA (US)

( * ) Notice: Subject to any disclaimer, the term of this patent is extended or adjusted under 35 U.S.C. 154(b) by 229 days.

(21) Appl. No.: 17/105,971

(22) Filed: Nov. 27, 2020

(65) Prior Publication Data

US 2022/0172076 A1 Jun. 2, 2022

(51) Int. Cl.
*G06F 15/16* (2006.01)
*G06N 5/025* (2023.01)
(Continued)

(52) U.S. Cl.
CPC .............. *G06N 5/025* (2013.01); *H04L 41/16* (2013.01); *H04L 43/067* (2013.01); *H04L 43/0876* (2013.01); *H04L 41/0876* (2013.01)

(58) Field of Classification Search
CPC ....... G06N 5/025; H04L 41/16; H04L 43/067; H04L 43/0876; H04L 41/0876;
(Continued)

(56) References Cited

U.S. PATENT DOCUMENTS 10,133,275 B1 * 11/2018 Kobilarov ................ G06N 3/08
10,671,076 B1 * 6/2020 Kobilarov .............. G08G 1/166
(Continued)

FOREIGN PATENT DOCUMENTS

CN        113015116 A   *   6/2021           H04W 28/10
CN        109495318 B   * 11/2021           H04L 41/145

OTHER PUBLICATIONS

Dana Angluin, "Learning Regular Sets from Queries and Counter-examples*", Department of Computer Science, Yale University, Academic Press, Inc. (1987), pp. 87-106.
(Continued)

*Primary Examiner* — Ario Etienne
*Assistant Examiner* — Thorne E Waugh

(57) ABSTRACT

A processing system including at least one processor may obtain a time series of measurement values from a communication network and train a prediction model in accordance with the time series of measurement values to predict future instances of an event of interest, where the time series of measurement values is labeled with one or more indicators of instances of the event of interest. The processing system may then generate a deterministic finite automaton based upon the prediction model, convert the deterministic finite automaton into a rule set, and deploy the rule set to at least one network component of the communication network.

20 Claims, 8 Drawing Sheets

(51) Int. Cl.
  *H04L 43/0876* (2022.01)
  *H04L 43/067* (2022.01)
  *H04L 41/16* (2022.01)
  *H04L 41/08* (2022.01)

(58) Field of Classification Search
  CPC .............. H04L 41/147; H04L 43/0817; H04L 43/0829; H04L 43/0888
  See application file for complete search history.

(56) References Cited

U.S. PATENT DOCUMENTS

| | | | |
|---|---|---|---|
| 10,680,889 B2* | 6/2020 | Vasseur | H04L 41/147 |
| 11,146,463 B2* | 10/2021 | Tedaldi | H04L 45/64 |
| 11,362,998 B2* | 6/2022 | Ganesh | H04L 63/20 |
| 2007/0188494 A1* | 8/2007 | Agutter | G06T 11/206 |
| | | | 345/440 |
| 2008/0263661 A1* | 10/2008 | Bouzida | H04L 63/1416 |
| | | | 726/22 |
| 2010/0138367 A1* | 6/2010 | Yamagaki | G06N 20/00 |
| | | | 706/50 |
| 2016/0350411 A1* | 12/2016 | Tristan | G06F 16/353 |
| 2019/0280942 A1* | 9/2019 | Coôté | G06N 3/08 |
| 2020/0104671 A1* | 4/2020 | Wang | G06N 3/08 |

OTHER PUBLICATIONS

Weiss et al., "Extracting Automata from Recurrent Neural Networks Using Queries and Counterexamples", Proceedings of the 35th International Conference on Machine Learning (2018), 10 pages.

* cited by examiner

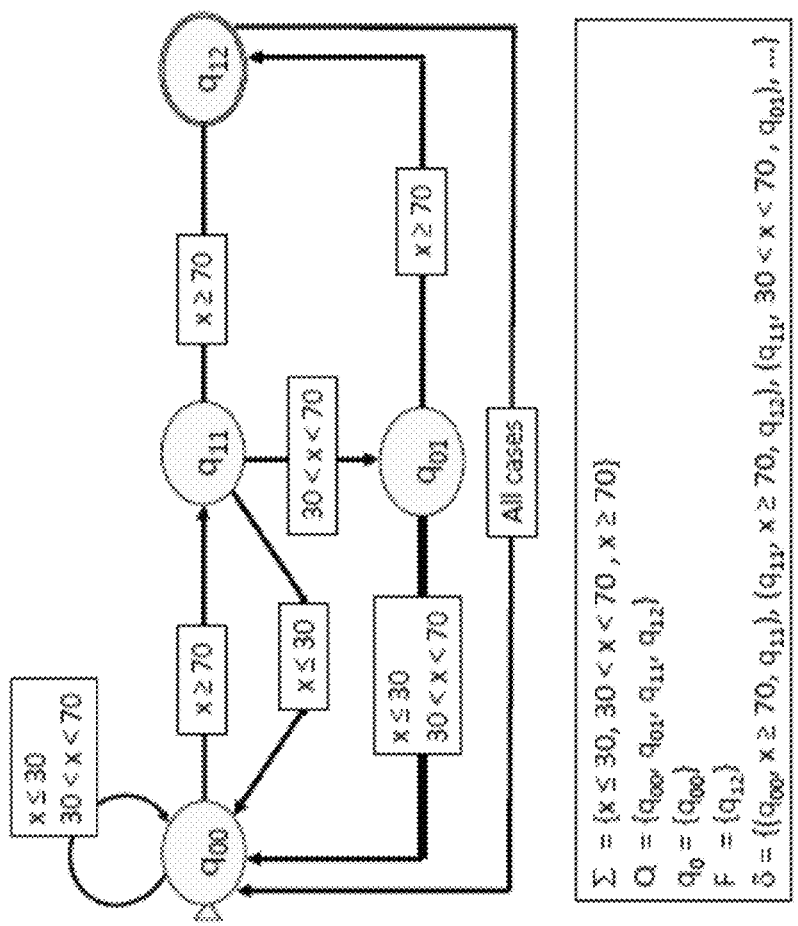
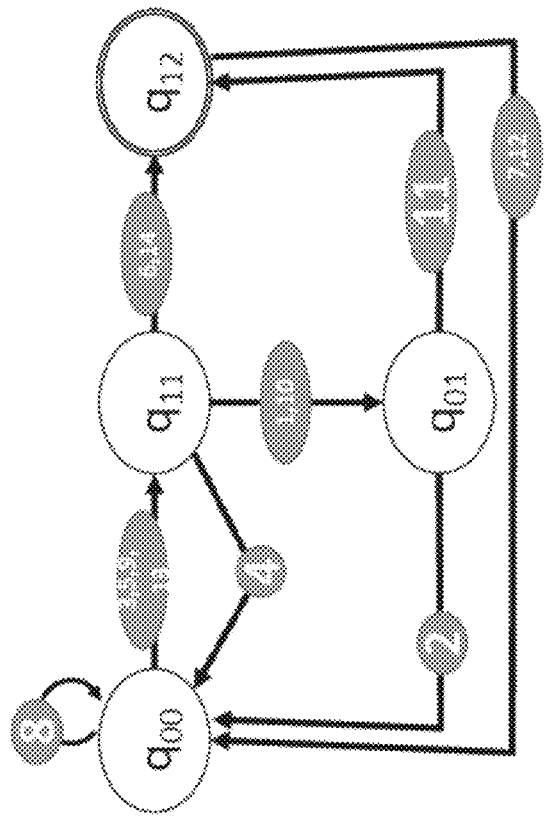
FIG. 5

610

Algorithm 1 Transforming DFA into P4 Rules

Input: $A = (Q, \Sigma, \delta, q_0, F)$
Output: A table $T_\delta$ and a table $T_F$ of P4 rules 1: let $T_\delta$ and $T_F$ be match-action tables with schema (Match, Action)
2: for $(q_{i,j}, q_{i',j'}, x) \in \delta$ do
3:     $r \leftarrow (state = q_{i,j} \text{ \&\& } x, state = q_{i',j'})$
4:     insert $r$ into $T_\delta$
5: end for
6: for $q_{i,j} \in F$ do
7:     $r \leftarrow (state = q_{i,j}, state = q_0 \text{ \&\& } action)$
8:     insert $r$ into $T_F$
9: end for
10: return $T_\delta$ and a $T_F$

620

| Match | Action |
|---|---|
| state = $q_{00}$ && x ≥ 70 | state = $q_{11}$ |
| state = $q_{11}$ && x ≥ 70 | state = $q_{12}$ |
| state = $q_{11}$ && x ≤ 30 | state = $q_{00}$ |
| state = $q_{11}$ && 30 < x < 70 | state = $q_{01}$ |
| state = $q_{01}$ && 30 < x < 70 | state = $q_{00}$ |
| state = $q_{01}$ && x ≤ 30 | state = $q_{00}$ |
| state = $q_{01}$ && x ≥ 70 | state = $q_{12}$ |

640

| Match | Action |
|---|---|
| state = $q_{12}$ | *User defined action,* state = $q_{00}$ |

630

$\Sigma = \{x \leq 30, 30 < x < 70, x \geq 70\}$
$Q = \{q_{00}, q_{01}, q_{11}, q_{12}\}$
$q_0 = \{q_{00}\}$
$F = \{q_{12}\}$
$\delta = \{(q_{00}, x \geq 70, q_{11}), (q_{11}, x \geq 70, q_{12}), (q_{11}, 30 < x < 70, q_{01}), ...\}$

FIG. 6

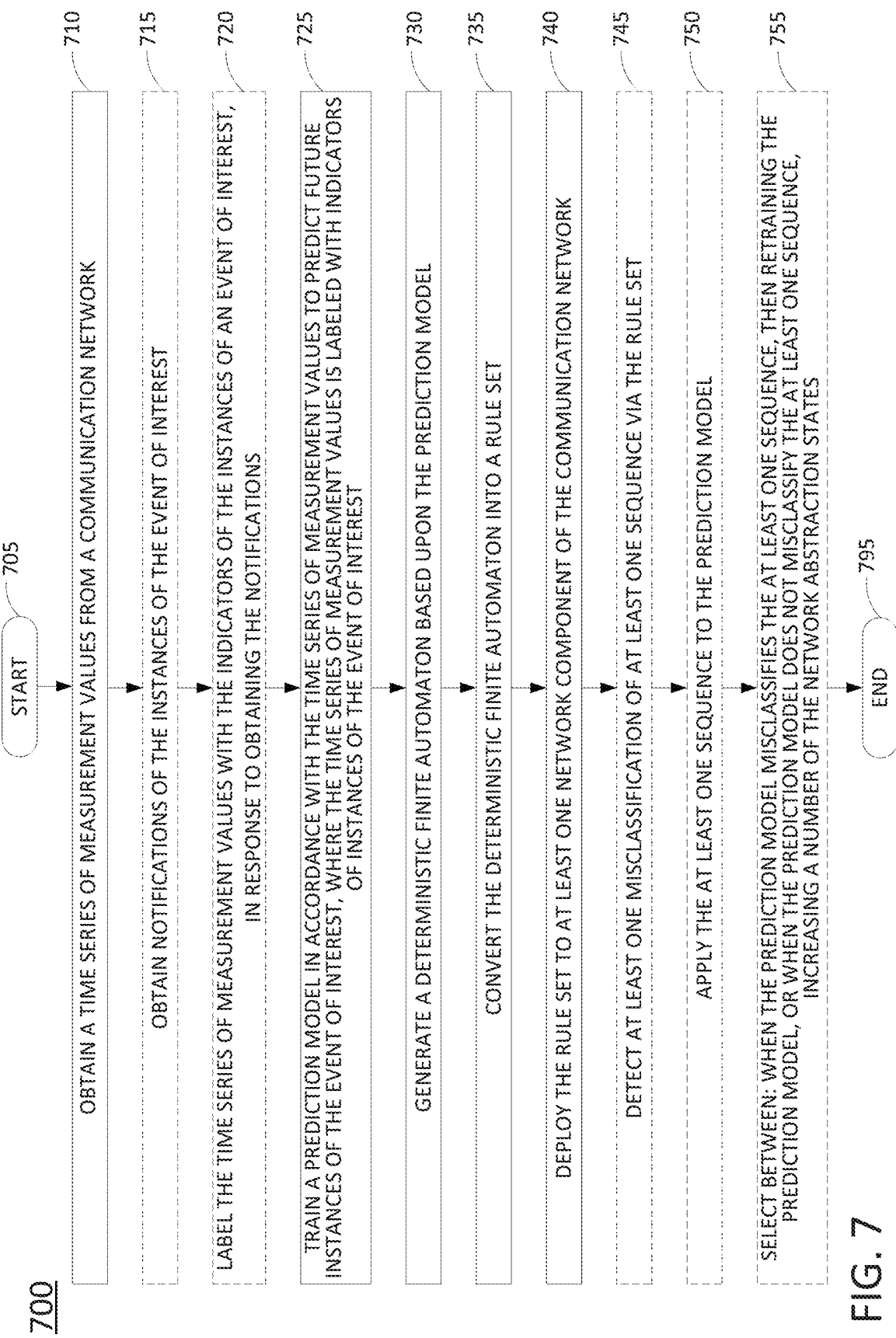

PREDICTION OF NETWORK EVENTS VIA RULE SET REPRESENTATIONS OF MACHINE LEARNING MODELS

The present disclosure relates generally to machine learning model deployment, and more particularly to methods, computer-readable media, and apparatuses for generating a deterministic finite automaton based upon a prediction model and converting the deterministic finite automaton into a rule set for deployment to at least one network component.

BACKGROUND

Machine learning in computer science is the scientific study and process of creating algorithms based on data that perform a task without any instructions. These algorithms are called models and different types of models can be created based on the type of data that the model takes as input and also based on the type of task (e.g., prediction, classification, or clustering) that the model is trying to accomplish. The general approach to machine learning involves using the training data to create the model, testing the model using the cross-validation and testing data, and then deploying the model to production to be used by real-world applications.

SUMMARY

In one example, the present disclosure describes a method, computer-readable medium, and apparatus for generating a deterministic finite automaton based upon a prediction model and converting the deterministic finite automaton into a rule set for deployment to at least one network component. For instance, in one example, a processing system including at least one processor may obtain a time series of measurement values from a communication network and train a prediction model in accordance with the time series of measurement values to predict future instances of an event of interest, where the time series of measurement values is labeled with one or more indicators of instances of the event of interest. The processing system may then generate a deterministic finite automaton based upon the prediction model, convert the deterministic finite automaton into a rule set, and deploy the rule set to at least one network component of the communication network.

BRIEF DESCRIPTION OF THE DRAWINGS

The present disclosure can be readily understood by considering the following detailed description in conjunction with the accompanying drawings, in which:

FIG. 5 illustrates a transition from a network abstraction to a deterministic finite automation (DFA) in accordance with the present disclosure;

FIG. 6 illustrates aspects of converting a deterministic finite automation (DFA) into a rule set (e.g., a set of switch rules) in accordance with the present disclosure;

FIG. 7 illustrates a flowchart of an example method for generating a deterministic finite automaton based upon a prediction model and converting the deterministic finite automaton into a rule set for deployment to at least one network component.

To facilitate understanding, identical reference numerals have been used, where possible, to designate identical elements that are common to the figures.

DETAILED DESCRIPTION

Figure 1:
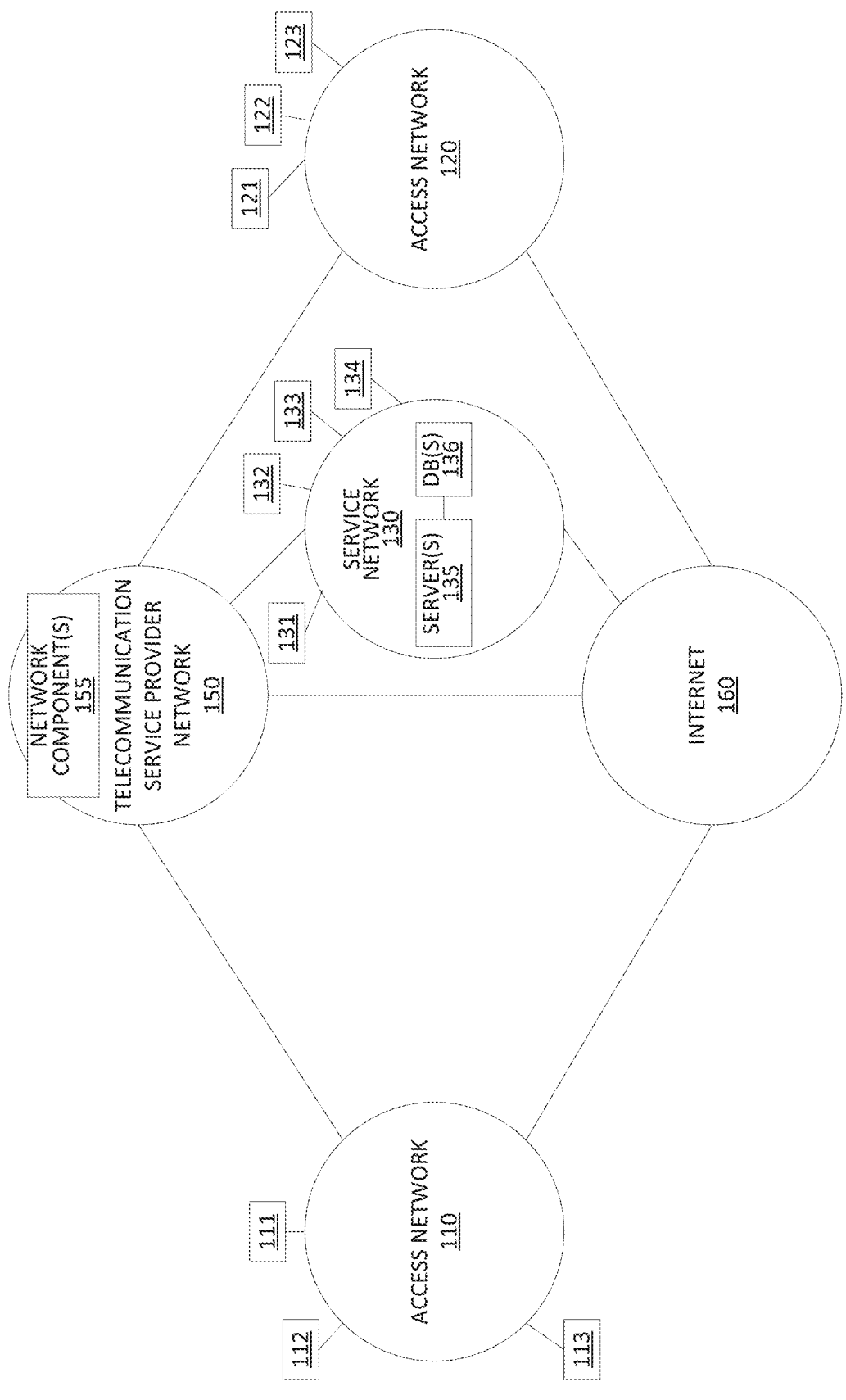
FIG. 1 illustrates one example of a system related to the present disclosure.

The present disclosure broadly discloses methods, non-transitory (i.e., tangible or physical) computer-readable storage media, and apparatuses for generating a deterministic finite automaton based upon a prediction model and converting the deterministic finite automaton into a rule set for deployment to at least one network component. Predicting transient network events like microbursts or link congestion, even a few microseconds before they occur, can help to mitigate their harmful effects in a communication network. Machine learning (ML) prediction has already been proven successful in a variety of fields, and recurrent neural networks (RNNs), such as long-short-term-memory (LSTM) models are often used for event prediction over streaming data. However, applying an LSTM model in hardware-limited network components may be impractical or not possible. For instance, programmable switches may offer a limited set of instructions, which may be insufficient for implementing complex neural networks like LSTM models. In addition, an LSTM may be too slow for prediction at line rate. However, examples of the present disclosure enable predicting transient network events by using rule sets that approximate an LSTM model (e.g., switch rules and/or P4 rules). For instance, in one example, a prediction model (e.g., an LSTM model) is trained offline and transformed into a deterministic finite automaton (DFA). Then, the DFA is transformed into a rule set (e.g., P4 rules) that is used for prediction at line rate. Detected events provide labeled data for verifying or retraining the prediction model, thereby improving the prediction model and coping with changes. Examples of the present disclosure are proven to be practical and highly accurate in predicting network events, such as microbursts and excessive link utilization events.

Various network events are transient and yet have the potential to severely impact network traffic. For instance, microbursts are ephemeral traffic bursts, which cause brief (measured in microseconds) congestion in a switch's egress queue. Albeit short, a microburst can cause delays, jitter, packet drops, and so forth. As such, it is desirable to mitigate transient events at microsecond scale, including monitoring the switch and reacting to events. However, such speed may not be achievable by measuring states at the data plane, sending information to the control plane and receiving back actions from a controller, for two reasons. First, the delay in sending the data from the data plane to the control plane and back is already orders of magnitude larger than a microsecond. Second, sending monitoring information from the data plane to the control plane every microsecond could cause congestion and further impact network performance.

Network traffic and network services change frequently in a data center, and are interdependent. Thus, conditions that could predict an event in a switch in the past may no longer be a good predictor in the future. Trend-based predictors, like exponentially weighted moving average (EWMA), may work better than static thresholds but complexities in network traffic dynamics may limit the EWMA prediction accuracy. Machine learning (ML) can be used to learn correlations between observations at the switch level and network events of interest. The ML trained model can then be used to predict future network events from switch-level observations. Recurrent neural networks (RNN), and in particular LSTM which is a type of RNN, are among the most effective ML tools for event prediction over streaming data. However, it may not be possible to deploy an LSTM for the prediction of transient network events in hardware limited network components, e.g., network switches (such as P4 enable programmable switches). For instance, LSTM uses functions like hyperbolic tangent (tanh) and sigmoid, which utilize floating-point operations that are not supported by P4. In addition, even if possible to deploy an LSTM model to such network component(s), the time to process input data and output a prediction may be too slow to be useful.

Notably, examples of the present disclosure provide an alternative framework of rule-based ML prediction, e.g., for hardware limited network components, such as P4 programmable switches, but which is also applicable to a variety of other network components that may benefit from an accurate yet lightweight prediction tool. In one example, a prediction model (such as an LSTM model) is trained offline using labeled training/testing data from one or more network components' past observations, e.g., a time series of "measurement values" or "traffic data." In one example, the data is automatically labeled by the network component(s), since the network component(s) can observe the incidence of network events of interest. Second, the trained prediction model is transformed into a deterministic finite automaton (DFA). Third, the DFA is transformed into a set of rules (e.g., P4 rules, or the like). Fourth, the rules are deployed on one or more network components (e.g., the same or a different set of one or more network components from which the training/testing data is/are obtained), and are used for prediction (e.g., at line rate and/or microsecond scale). Finally, collected traffic data is used to validate the prediction model or retrain it by repeating the first four steps with new labeled data. Notably, rule-set representations of ML-based prediction models (e.g., LSTM models) are demonstrated to be within 2-5.7% accuracy of a trained LSTM model running on a separate platform. In addition, rule set-based transformations of ML models for network event prediction are shown to utilize little more than 6,000 match-action rules.

As such, examples of the present disclosure may be deployed to network components to predict transient events and proactively apply early mitigation steps. For example, when a microburst is predicted, a switch or other network components can forward to vacant buffers some of the packets intended for the congested buffer, to apply a mitigation policy like rerouting to a different switch, delaying packets until the end of the microburst, etc. Prediction of a high queue or link utilization could help the network component implement different routing policies or send an early congestion signal upstream. Predicting security events may enable early derivation and application of attack signatures and firewall rules, to lessen the impact on legitimate traffic. Predicting elephant flows can trigger proactive execution of load balancing before such flows lead to congestion. Predicting incast events can lead to spin up of additional network services at a different server, dissipating congestion before it builds up, and so on.

Microbursts are momentary surges in network traffic, which often lead to traffic delay or packet drops. It has been observed that in data centers there is merely a weak correlation between packets being dropped and link utilization. This implies that most of the congestion events in data centers are transient. Typically, shallow router buffers are sufficient for optimal utilization of data center networks components. However, given the long-tail nature of data center traffic, ephemeral events like microbursts occur every so often and may cause queue build-up, resulting in packet losses. Ideally, microbursts would be detected before they occur, i.e., as a switch queue starts filling up, so that the switch can take action to mitigate the congestion, such as forwarding packets to a less utilized queue.

Network monitoring tools, such as Simple Network Management Protocol (SNMP), are commonly used to monitor various components and metrics in the network (including queue occupancy). However, SNMP may need a few minutes to collect and process data; hence it is too slow for the detection of microbursts. Recent advancements in switches (e.g., P4-enabled programmable switches), such as Inband Network Telemetry (INT), provide tools for monitoring a switch at microsecond timescale. However, this generates a tremendous volume of data (e.g., 1.7 Gbps of INT traffic data per port for every 40 Gbps of traffic). Moreover, collected data is still processed offline, which does not give enough time to react to microbursts.

Some applications require low bandwidth but have low latency requirements. Low latency can be achieved by offloading applications to a network interface card (NIC). However, a switch might itself contribute to the latency when the link utilization is high. To cope with this scenario, methods like Active Queue Management signal to an end host when congestion starts building up, to adjust the packet-sending rate. However, such switch-to-host feedback takes time on the order of milliseconds, and may not prevent congestion buildup early enough. Thus, achieving low latency may need proactive signaling before any queuing occurs (that is, even before congestion in the queue). In one approach, bandwidth headroom is used to constrain link capacity, which may lead to a significant reduction in average and tail queue latency. Yet, there is a trade-off between the loss in bandwidth and gain in latency. This can be configured by setting an appropriate bandwidth headroom. Higher (lower) bandwidth headroom increases (decreases) the throughput (latency) of large flows (latency-sensitive applications). In some instances, the bandwidth headroom may be set conservatively to balance this trade-off. Thus, prediction whether the link utilization will exceed the bandwidth headroom, e.g., via examples of the present disclosure, may facilitate a decrease in the unused bandwidth headroom.

Network switches operate in a dynamic environment. Changes in the network traffic often affect the state of the switch, e.g., how congested are the buffers, what is the number of packets through a particular port, etc. Programmable switches can collect various measurement values (e.g., traffic data), such as: ingress and egress queue occupancy (in bytes or packets, in percentage of the total size of the queue, etc.), queue utilization, processor utilization (e.g., central processing unit (CPU) utilization, graphics processing unit (GPU) utilization, etc.), counters that relate to specific flows, traffic rates at different links, etc. For instance, a queue occupancy measurement value may represent the percentage of the queue currently in use relative to the entire size of the queue, e.g., 50% queue occupancy means that half of the queue is full.

In one example, measured values are collected at a rate that is associated with a capability of the network component hardware. For instance, measured values may be obtained once per microsecond for a P4 switch. This provides a stream of measured values that are considered as features of the switch state. In one example, the stream of measured values may comprise a time series of measured values and may be denoted by $x_1, x_2, \ldots, x_t, \ldots$ where $x_t$ is a vector (array) of the feature(s) measured at time t.

A network event is defined by the network operator as an event of interest that should be predicted at a network component. In the present disclosure, it is assumed that such an event can be detected after it occurs, e.g., by measured value(s) exceeding a threshold. For instance, an egress queue occupancy exceeding 15% for at least three microseconds could be defined as a microburst. Similarly, a case where the rate of packets to a specific Internet Protocol (IP) address exceeds a given threshold, based on a packet counter, could be deemed a denial of service (DoS) event, etc. This assumption enables the automatic correction/retraining of a learned prediction model when prediction accuracy declines. For instance, when a stream of measured features/values is examined, it is straightforward to determine the times when an instance of a type of event occurred. For example, if at time t the occupancy of the egress queue exceeded the microburst threshold, it may be stated that an event occurred at t. In one example, a labeling function may map measured features/values at t to true if an event occurred at t, and to false otherwise, e.g.: let label($x_1$), label($x_2$), . . . , label($x_t$), . . . be the labeling of the measured features.

A prediction function with p time-units look-ahead is a function Pred( ) that at time t returns a predicted label for time t+p. That is, after seeing $x_1, x_2, \ldots, x_t$, the function returns true if it predicts the event will occur at time t+p, and false otherwise. The prediction is correct if the predicted label is equal to the observed future state, e.g., Pred($x_t$)=label($x_t$+p). A correct prediction of an event (no event) is considered a true positive (true negative) case, respectively. An incorrect prediction of an event (no event) is considered a false positive (false negative) case, respectively. In prediction over a time period, the accuracy of the prediction may be evaluated using the following measures. Recall (or sensitivity) is the ratio |TP|/(|TP|+|FN|), where |TP| and |FN| are the numbers of true-positive and false-negative cases, respectively. It is the percentage of events that were predicted out of the total number of events. Precision is the ratio |TP|/(|TP|+|FP|), the percentage of predicted events that are truly events, where |FP| is the number of false-positive cases. F1 score is the harmonic mean of the recall and the precision.

As noted above, static thresholds may be used in various deployments. However, depending upon the conservative-to-risky level, a static threshold may be able to achieve high recall but suffer from low precision, may suffer from low recall and low precision, or may have high precision but low recall. In each case, the static threshold may fail to simultaneously provide both high precision and high recall. Similarly, exponential weighted moving average (EWMA) thresholds may also fail to simultaneously achieve both high precision and high recall. In contrast, examples of the present disclosure utilize ML models that are proven to achieve high recall, precision, and F1 scores.

It should be noted that although examples of the present disclosure are described herein primarily in connection with an LSTM model, in other, further, and different examples, the present disclosure may utilize other types of RNNs, such as GRUs, other types of neural networks, or other types of machine learning models that are suitable for predicting network events based upon a time series of measurement values. It should also be noted that although examples of the present disclosure are described herein primarily in connection with programmable switches, the present disclosure may be applied to various other types of network components, such as routers, firewalls, proxy servers, software defined network (SDN) controllers, gateways, border elements, content distribution network ingress or edge nodes, application servers, database servers, and so forth. Thus, it should be understood that any specific examples relating to LSTMs and/or programmable switches are provided for illustrative purposes, and that the present teachings are equally applicable to various additional examples. These and other aspects of the present disclosure are discussed in greater detail below in connection with the examples of FIGS. 1-8.

To aid in understanding the present disclosure, FIG. 1 illustrates an example system 100 comprising a plurality of different networks in which examples of the present disclosure may operate. Telecommunication service provider network 150 may comprise a core network with components for telephone services, Internet services, and/or television services (e.g., triple-play services, etc.) that are provided to customers (broadly "subscribers"), and to peer networks. In one example, telecommunication service provider network 150 may combine core network components of a cellular network with components of a triple-play service network. For example, telecommunication service provider network 150 may functionally comprise a fixed-mobile convergence (FMC) network, e.g., an IP Multimedia Subsystem (IMS) network. In addition, telecommunication service provider network 150 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Telecommunication service provider network 150 may also further comprise a broadcast television network, e.g., a traditional cable provider network or an Internet Protocol Television (IPTV) network, as well as an Internet Service Provider (ISP) network. With respect to television service provider functions, telecommunication service provider network 150 may include one or more television servers for the delivery of television content, e.g., a broadcast server, a cable head-end, a video-on-demand (VoD) server, and so forth. For example, telecommunication service provider network 150 may comprise a video super hub office, a video hub office and/or a service office/central office.

In one example, telecommunication service provider network 150 may also include one or more network components 155. In one example, the network components 155 may each comprise a computing device or system, such as computing system 800 depicted in FIG. 8, and may be configured to host one or more centralized and/or distributed system/network components. For example, a first system may comprise, for example, a switch, a layer 3 router, a short message service (SMS) server, a firewall, a proxy server, a gateway, a border element, a voicemail server, a video-on-demand server, a server for network traffic analysis, and so forth. Other network components 155 may include a database of assigned telephone numbers, a database of basic customer account information for all or a portion of the customers/subscribers of the telecommunication service provider network 150, a cellular network service home location register (HLR), e.g., with current serving base station information of various subscribers, and so forth. Other network components 155 may include a Simple Network Management Protocol (SNMP) trap, or the like, a billing system, a customer relationship management (CRM) system, a trouble ticket system, an inventory system (IS), an ordering system, an enterprise reporting system (ERS), an account object (AO) database system, and so forth. It should be noted that some network components 155 may comprise individual devices, while other network components 155 may represent a processing system comprising multiple physical devices (e.g., multiple servers in a same or in different data centers or the like, a processing system comprising a distributed shared memory, etc.). For ease of illustration, various components of telecommunication service provider network 150 are omitted from FIG. 1.

In one example, access networks 110 and 120 may each comprise a Digital Subscriber Line (DSL) network, a broadband cable access network, a Local Area Network (LAN), a cellular or wireless access network, and the like. For example, access networks 110 and 120 may transmit and receive communications between endpoint devices 111-113, endpoint devices 121-123, and service network 130, and between telecommunication service provider network 150 and endpoint devices 111-113 and 121-123 relating to voice telephone calls, communications with web servers via the Internet 160, and so forth. Access networks 110 and 120 may also transmit and receive communications between endpoint devices 111-113, 121-123 and other networks and devices via Internet 160. For example, one or both of the access networks 110 and 120 may comprise an ISP network, such that endpoint devices 111-113 and/or 121-123 may communicate over the Internet 160, without involvement of the telecommunication service provider network 150. Endpoint devices 111-113 and 121-123 may each comprise a telephone, e.g., for analog or digital telephony, a mobile device, such as a cellular smart phone, a laptop, a tablet computer, etc., a router, a gateway, a desktop computer, a plurality or cluster of such devices, a television (TV), e.g., a "smart" TV, a set-top box (STB), and the like. In one example, any one or more of endpoint devices 111-113 and 121-123 may represent one or more user devices (e.g., subscriber/customer devices) and/or one or more servers of one or more third parties, such as a credit bureau, a payment processing service (e.g., a credit card company), an email service provider, and so on.

In one example, the access networks 110 and 120 may be different types of access networks. In another example, the access networks 110 and 120 may be the same type of access network. In one example, one or more of the access networks 110 and 120 may be operated by the same or a different service provider from a service provider operating the telecommunication service provider network 150. For example, each of the access networks 110 and 120 may comprise an Internet service provider (ISP) network, a cable access network, and so forth. In another example, each of the access networks 110 and 120 may comprise a cellular access network, implementing such technologies as: global system for mobile communication (GSM), e.g., a base station subsystem (BSS), GSM enhanced data rates for global evolution (EDGE) radio access network (GERAN), or a UMTS terrestrial radio access network (UTRAN) network, among others, where telecommunication service provider network 150 may provide service network 130 functions, e.g., of a public land mobile network (PLMN)-universal mobile telecommunications system (UMTS)/General Packet Radio Service (GPRS) core network, or the like. In still another example, access networks 110 and 120 may each comprise a home network or enterprise network, which may include a gateway to receive data associated with different types of media, e.g., television, phone, and Internet, and to separate these communications for the appropriate devices. For example, data communications, e.g., Internet Protocol (IP) based communications may be sent to and received from a router in one of the access networks 110 or 120, which receives data from and sends data to the endpoint devices 111-113 and 121-123, respectively.

In this regard, it should be noted that in some examples, endpoint devices 111-113 and 121-123 may connect to access networks 110 and 120 via one or more intermediate devices, such as a home gateway and router, an Internet Protocol private branch exchange (IPPBX), and so forth, e.g., where access networks 110 and 120 comprise cellular access networks, ISPs and the like, while in another example, endpoint devices 111-113 and 121-123 may connect directly to access networks 110 and 120, e.g., where access networks 110 and 120 may comprise local area networks (LANs), enterprise networks, and/or home networks, and the like.

In one example, the service network 130 may comprise a local area network (LAN), or a distributed network connected through permanent virtual circuits (PVCs), virtual private networks (VPNs), and the like for providing data and voice communications. In one example, the service network 130 may be associated with the telecommunication service provider network 150. For example, the service network 130 may comprise one or more devices for providing services to subscribers, customers, and/or users. For example, telecommunication service provider network 150 may provide a cloud storage service, web server hosting, and other services. Alternatively, or in addition, the service network 130 may comprise one or more devices for providing internal services for the telecommunication service provider network 150. As such, service network 130 may represent aspects of telecommunication service provider network 150 where infrastructure for supporting such services may be deployed.

In one example, the service network 130 links one or more devices 131-134 with each other and with Internet 160, telecommunication service provider network 150, devices accessible via such other networks, such as endpoint devices 111-113 and 121-123, and so forth. In one example, devices 131-134 may each comprise a telephone for analog or digital telephony, a mobile device, a cellular smart phone, a laptop, a tablet computer, a desktop computer, a bank or cluster of such devices, and the like. In an example where the service network 130 is associated with the telecommunication service provider network 150, devices 131-134 of the service network 130 may comprise devices of network personnel, such as network operations personnel and/or personnel for network maintenance, network repair, construction planning, and so forth.

In the example of FIG. 1, service network 130 may include one or more servers 135 which may each comprise all or a portion of a computing device or processing system, such as computing system 800, and/or a hardware processor element 802 as described in connection with FIG. 8 below, specifically configured to perform various steps, functions, and/or operations for generating a deterministic finite automaton based upon a prediction model and converting the deterministic finite automaton into a rule set for deployment to at least one network component, as described herein. For example, one of the server(s) 135, or a plurality of servers 135 collectively, may perform operations in connection with the example architecture 200 of FIG. 2 and/or the example method 700 of FIG. 7, or as otherwise described herein. In one example, the one or more of the servers 135 may comprise an MLM-based service platform (e.g., a network-based and/or cloud-based service hosted on the hardware of servers 135). For instance, server(s) 135 may train and generate MLMs for network event prediction based upon time series of measurement values obtained from network components 155, may convert the MLMs to DFAs, convert the DFAs to rule sets for deployment to one or more of the network components 155, and so forth.

In addition, it should be noted that as used herein, the terms "configure," and "reconfigure" may refer to programming or loading a processing system with computer-readable/computer-executable instructions, code, and/or programs, e.g., in a distributed or non-distributed memory, which when executed by a processor, or processors, of the processing system within a same device or within distributed devices, may cause the processing system to perform various functions. Such terms may also encompass providing variables, data values, tables, objects, or other data structures or the like which may cause a processing system executing computer-readable instructions, code, and/or programs to function differently depending upon the values of the variables or other data structures that are provided. As referred to herein a "processing system" may comprise a computing device, or computing system, including one or more processors, or cores (e.g., as illustrated in FIG. 8 and discussed below) or multiple computing devices collectively configured to perform various steps, functions, and/or operations in accordance with the present disclosure.

In one example, service network 130 may also include one or more databases (DBs) 136, e.g., physical storage devices integrated with server(s) 135 (e.g., database servers), attached or coupled to the server(s) 135, and/or in remote communication with server(s) 135 to store various types of information in support of systems for generating a deterministic finite automaton based upon a prediction model and converting the deterministic finite automaton into a rule set for deployment to at least one network component, as described herein. As just one example, DB(s) 136 may be configured to receive and store network operational data collected from the telecommunication service provider network 150, such as call logs, mobile device location data, control plane signaling and/or session management messages, data traffic volume records, call detail records (CDRs), error reports, network impairment records, performance logs, alarm data, and other information and statistics, which may then be compiled and processed, e.g., normalized, transformed, tagged, etc., and forwarded to DB(s) 136, via one or more of the servers 135. In one example, DB(s) may receive and store time series of measurement values from one or more of the network components 155, such as measurement values of a queue occupancy, a buffer occupancy, a port throughput, a processor utilization, a memory utilization, a link utilization, and so forth. In one example, server(s) 135 and/or DB(s) 136 may comprise cloud-based and/or distributed data storage and/or processing systems comprising one or more servers at a same location or at different locations. For instance, DB(s) 136, or DB(s) 136 in conjunction with one or more of the servers 135, may represent a distributed file system, e.g., a Hadoop® Distributed File System (HDFS™), or the like.

Operations of server(s) 135 for generating a deterministic finite automaton based upon a prediction model and converting the deterministic finite automaton into a rule set for deployment to at least one network component, and/or server(s) 135 in conjunction with one or more other devices or systems (such as DB(s) 136) are further described below in connection with the examples of FIGS. 2-7. In addition, it should be realized that the system 100 may be implemented in a different form than that illustrated in FIG. 1, or may be expanded by including additional endpoint devices, access networks, network elements, application servers, etc. without altering the scope of the present disclosure. As just one example, any one or more of server(s) 135 and DB(s) 136 may be distributed at different locations, such as in or connected to access networks 110 and 120, in another service network connected to Internet 160 (e.g., a cloud computing provider), in telecommunication service provider network 150, and so forth. In still another example, DB(s) 136 may obtain measurement values relating to one or more network components of a different network (e.g., of a customer network), while server(s) 135 may generate and train a MLM to predict network events relating to the one or more network components thereof, may derive a DFA from the MLM, and may translate the DFA into a rule set for deployment to one or more components of the other network. For instance, an operator of telecommunication service provider network 150 and/or service network 130 may provide a service for generating and providing network event detection rule sets as a service to customers/subscribers, e.g., in addition to other communication services, such as telephony services, television services, etc. Thus, these and other modifications are all contemplated within the scope of the present disclosure.

As noted above, although INT and P4 provide tools to measure the switch state and react without approaching the control plane, implementing an ML prediction model in a switch is difficult due to the following limitations. First, it is impractical to train the model in the switch, because training a model requires computation resources (like CPU and memory) that are not available in a switch. Second, P4 does not support the required operations for implementing LSTM (like tanh and sigmoid). Third, there is a need to support autonomous adaptation to varying traffic patterns, but the switch has limited capabilities and resources for collecting data, detecting changes in traffic patterns and applying adjustments to the prediction model. The present disclosure provides one or more embodiments to address one or more of these difficulties.

Figure 2:
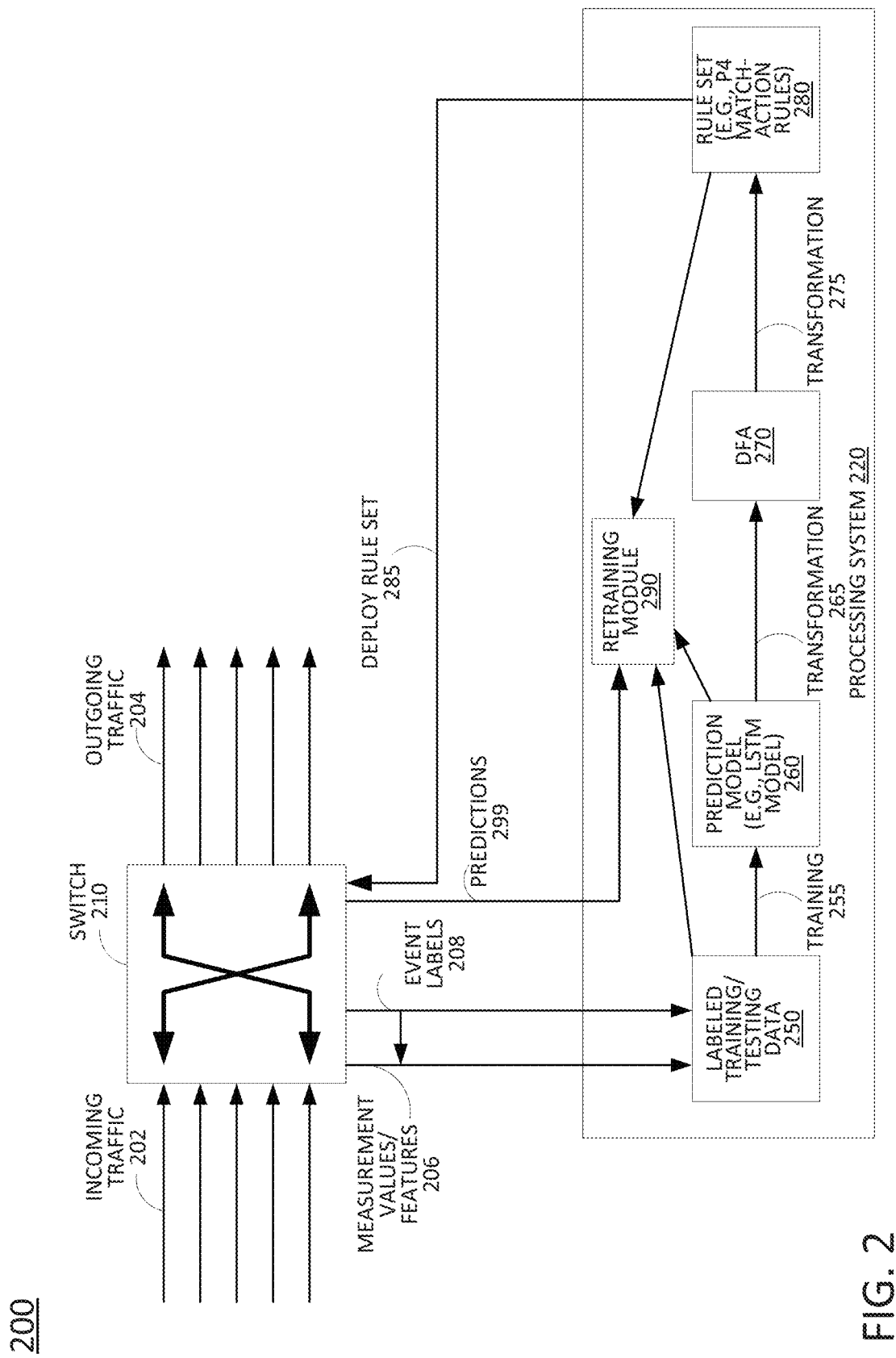
FIG. 2 illustrates an example architecture for generating a deterministic finite automaton based upon a prediction model and converting the deterministic finite automaton into a rule set for deployment to at least one network component, in accordance with the present disclosure.

FIG. 2 illustrates an example architecture 200 for generating a deterministic finite automaton based upon a prediction model and converting the deterministic finite automaton into a rule set for deployment to at least one network component, in accordance with the present disclosure. In one example, the architecture 200 may be implemented via a processing system comprising one or more physical devices and/or components thereof, such as a server or a plurality of servers, a database system, and so forth. For instance, various aspects of the architecture 200 may be provided via components as illustrated FIG. 1, including server(s) 135 and/or DB(s) 136, network component(s) 155, etc.

As shown in FIG. 2, the architecture 200 includes a switch 210 and a processing system 220 for generating a deterministic finite automaton based upon a prediction model and converting the deterministic finite automaton into a rule set for deployment to at least one network component. In one example, the processing system 220 may be the same as or similar to server(s) 135 of FIG. 1. In one example, there are four aspects to building and maintaining a prediction model. (1) Labeling—Features of network traffic or other measured values in the network that are collected in the recent past are labeled automatically, based on network event detection, to serve as the labeled data for training and/or testing the model. (2) Model training—Based on the labeled data, a model for event prediction is trained/tested. The prediction model is then transformed into a rule set that can be deployed on the switch. (3) Deployment—The generated rules of the rule set are inserted into one or more match-action tables of the switch. The result is a pipeline of match-action tables that implement a state machine for event prediction. (4) Verification—After the deployment of the rule set, additional data may be collected to determine the accuracy of the predictions. Based on the results, the prediction model may be verified and retrained. Alternatively, or additionally, the transformation of the prediction model into the rule set may be revised (e.g., by increasing the number of states in the generated DFA, and accordingly increasing the number of rules) to provide for additional precision.

In one example, and as illustrated in FIG. 2, to train the prediction model 260, the processing system 220 may collect a set or stream of features, or measurement values 206 captured by the switch 210. The measurement values 206 may relate to the incoming traffic 202 such as a packet arrival rate, a packet inter-arrival time, a packet loss rate, an average packet size in a given time interval, a simultaneous number of flows handled by the switch 210 in a given time interval, or the like. In one example, the measurement values 206 may be an overall metric for the switch 210, or may be on a per port basis, a per network interface card basis, a per flow basis, etc. In one example, the measurement values 206 may relate to hardware performance of the switch 210, such as a processor utilization, a memory utilization, a buffer occupancy, a queue occupancy, an idle time, and so forth. In any case, the processing system 220 obtains a sequence, or time series of measurement values 206, e.g., a value or values per time unit for each monitored entity (e.g., switch 210).

It should be noted that in the present example, for illustrative purposes a single value per time unit is considered. However, in other, further, and different examples, prediction model 260 may be trained on a time series comprising a vector of multiple measurement values for each time period (e.g., using buffer occupancy and CPU utilization to predict a buffer overflow, etc.). Similarly, for illustrative purposes, a single network component, switch 210, is considered. However, in other, further, and different examples, prediction model 260 may be trained on data from multiple network components, the rule set 280 generated therefrom may be deployed to the same or different network components, etc.

In one example, when switch 210 detects a network event (e.g., if a given value is above a certain threshold), switch 210 may provide an event label 208. In one example, the event labels 208 are applied and added to the forwarded measurement values 206. In another example, the event labels 208 are sent separately, e.g., as occasional events are detected. In still another example, the processing system 220 may not receive the event labels 208 from the switch 210, but may determine the labels by comparing the measurement values 206 to a threshold for an event of a particular type, and may apply a label of true when the event is detected from within the measurement values 206. Notably, this event detection may be performed offline with respect to training/testing of the prediction model 260 and is not for real time event detection. In any case, as illustrated in FIG. 2, the processing system 220 may collect labeled training/testing data 250 comprising at least the measurement values 206 obtained from switch 210 and the labels 208.

Next, the processing system 220 may apply a training process 255 to train the prediction model 260 using the labeled training/testing data 250. In one example, the training process 255 is performed via GPU resources of the processing system 220. In one example, the prediction model 260 comprises a LSTM model, which generally is superior for prediction tasks over streaming data, e.g., in comparison to parametric models like autoregressive integrated moving average (ARIMA). The LSTM model, however, may not be deployable directly on the switch 210 (e.g., a P4 programmable switch). For instance, as noted above LSTM requires computations of tanh and sigmoid functions (e.g., involving floating point operations that are not supported).

As such, in accordance with the present disclosure, the processing system 220 may apply a transformation process 265 to convert the prediction model 260 (e.g., the LSTM model) into a deterministic finite automaton (DFA) 270. Next, the processing system 220 may apply a second transformation process 275 to convert the DFA 270 into a rule set 280 (e.g., P4 match-action rules) that can be deployed and executed on the switch 210. Lastly, the rule set 280 is deployed (285) on the switch 210, e.g., as a pipeline of one or more match-action tables. For instance, a network operator may set the action(s) that is/are performed when a network event is predicted (e.g., as described in greater detail below).

In addition, the processing system 220 may further obtain predictions 299 from the switch 210. The processing system 220, e.g., via retraining module 290 may compare the predictions 299 with actual network events when they occur (which may be obtained from the labeled training/testing data 250). In one example, prediction errors (e.g., false positive and/or false negative predictions) are measured. Sequences of the measurement values 206 that resulted in the wrong prediction are collected, labeled, and used for retraining the prediction model 260 (and subsequent updating of the DFA 270 and rule set 280, accordingly). Alternatively, or in addition, the processing system 220 may determine that the prediction model 260 is accurate, in which case errors in the predictions 299 may be attributed to the transformation 265. For instance, errors in the prediction model 260 may occur due to insufficient training data or changes in the labeling function, e.g., due to changes in the network traffic. In such case, the collected data and its labels may be compared to the labels generated by the prediction model 260. However, if the prediction model 260 is accurate, the error may be attributed to the transformation 265 from prediction model 260 into DFA 270. Thus, the DFA 270 may be updated in a process described in greater detail below, and transformed in a new rule set 280, which then can be redeployed on the switch 210 to improve prediction accuracy.

To further aid in understanding the present disclosure, aspects of long short term memory (LSTM) models are now described. In particular, LSTM models are a type of recurrent neural network (RNN). An RNN provides a classification (prediction) over a stream $(x_1, x_2, \ldots, x_t, \ldots)$ of features (e.g., a time series). As features arrive, the RNN computes states while taking into account not just the last observation, but also preceding observations. An RNN comprises cells that receive streaming features as input and produce a stream of computed values. For example, an RNN can receive a stream of measurements values, or features, from a switch ingress and compute a stream of predictions regarding the future occupancy of the egress. Using self-loops, the cells retain some of the information from previously seen features, so that a prediction will be based on a history of the feature's values, and not a single measurement.

An LSTM model is an RNN that is designed to retain long term dependencies. To that end, an LSTM model learns which information to carry on and which information to forget when passing information in the self-loops. To implement this, LSTM cells have multiple gates and activation components to transfer information between cells. A forget gate is used to forget irrelevant information. For example, in the detection of egress congestion, congestion on the ingress is relevant for a short time and then should be forgotten if it does not persist. An input gate maintains relevant input. For example, in the detection of microbursts, this gate may not give the same weight to inputs regarding ingress congestion and inputs regarding the number of network flows, or it may dismiss some inputs altogether. An output gate determines what components to forward in the self-loop for the next iteration. For instance, it may transform the output in such a way that it will be clearer whether a microburst is predicted, by mapping values closer to 0 or 1. This design helps to retain long-term dependencies. The gates are implemented using a sigmoid function that typically maps inputs to be close to 0 or close to 1, so multiplying by it either retains the current value or sets it to zero.

Figure 3:
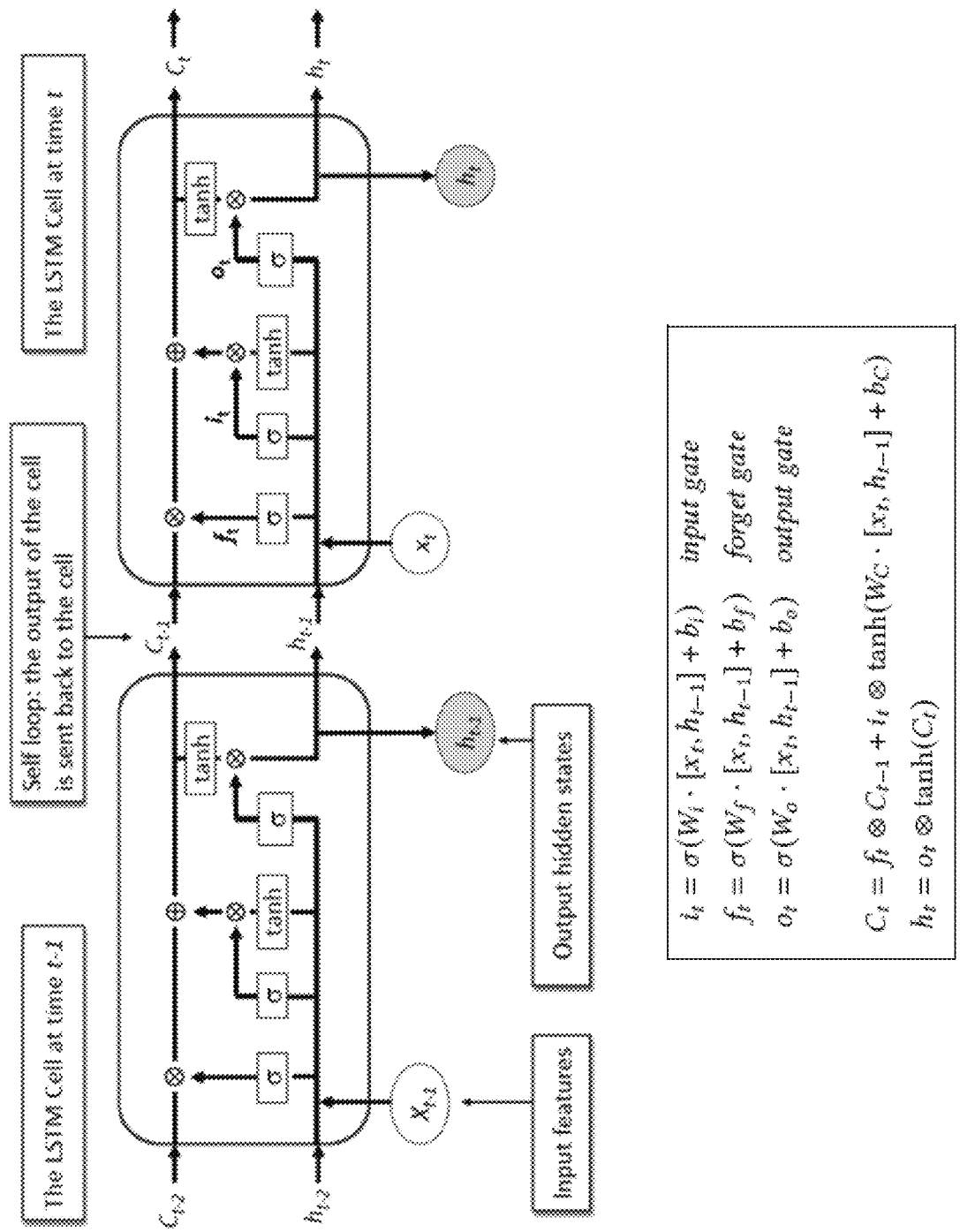
FIG. 3 illustrates an example long short term memory (LSTM) model that may be used in examples the present disclosure.

The three gates on an LSTM cell are arranged in a pipeline as shown in the example LSTM model 300 of FIG. 3. Each gate has associated weights ($W_i$, $W_f$, $W_o$, $W_c$) and biases ($b_i$, $b_f$, $b_o$, $b_c$). During the training phase, the LSTM classifier calibrates the weights and biases. Then, during the application stage (prediction), the LSTM cell receives a feature vector of $x_t$ as input, and the learned weights and biases. It produces the output $h_t$ (hidden state at time t) and transfers the cell state $C_t$ to the next iteration, using the equations as further shown in FIG. 3. In these equations, σ is the logistic sigmoid function and ⊗ is the element-wise product of vectors. The output can either be passed as an input to the following LSTM cell or can be the final output of the network.

It should be noted that while the example of FIG. 3 illustrates a single cell LSTM, an LSTM can have more than one cell. In this type of arrangement, the cells are connected and forward the cell state and hidden state to one another per each iteration. They also forward the values in a self-loop at the end of each iteration, similar to the example as illustrated in FIG. 3 for the single cell. The result of each step is a vector of hidden states, which are combined to provide the prediction. The training of the model determines the weights and biases for all the cells.

It is again noted that it is impractical to implement LSTM in a P4 switch due to limited support for floating-point operations. However, it is also relevant to the present disclosure to consider possible pipeline restrictions and memory constrains. For instance, while P4 switches do not support the tanh and sigmoid functions needed for LSTM, in one example, the tanh and sigmoid functions could be approximated using match-action tables. However, there would still be a need for a pipeline of at least seven operations (e.g., three operations for computing the gates $i_t$, $f_t$ and $o_t$ (the operations ·, +, σ), two additional operations for computing $C_t$ (⊗ and +), and two operations for computing $h_t$ (tanh and ⊗)). In addition, since tanh and sigmoid are not supported, approximating them would further lengthen the pipeline, and lead to high packet processing delays. Thus, while this approach is possible, additional examples of the present disclosure further overcome these challenges. In another example, it may be possible to implement the LSTM by mapping the LSTM directly to a match-action table, e.g., by matching each possible input to the learned value of the LSTM output. However, this may be impractical. Consider a sliding window over the streaming features where the l most recent features are kept for each one of the k processed features. The prediction function may be defined as Pred( ), that receives k sequences of l values.

A comprehensive match-action table would determine for each combination whether it is an event. However, even if there are only two possible values per each incoming parameter, this would require $2^{kl}$ entries in the match-action table. Maintaining and using such a table is not possible even for relatively small values of k and l, and there is not enough memory in a P4 switch to store such a table. Examples of the present disclosure overcome the above limitations by training an LSTM model in an external machine, e.g., with large memory and a GPU and by limiting the size of the match-action tables by determining the number of states in the created DFA. In the model training, the weights and biases are computed based on labeled data. This yields an external model for event prediction that is then translated into a DFA and converted into a condensed rule set (e.g., that is significantly smaller than a comprehensive match-action table created for all the possible combinations of measured values).

To execute prediction on a switch, the LSTM is transformed into a deterministic finite automaton (DFA) that represents a state machine. A DFA is a 5-tuple A=(Q, Σ, δ, $q_0$, F) that comprises of a set Q of states, an alphabet Σ, a transition function δ: Q×σ→Q, an initial state $q_0 \in Q$ and a subset F⊆Q of accepting states. Alphabet Σ is a discretization of the measured values (features), e.g., the set {0, 5, 10, . . . , 100} when relating to the percentage of ingress queue occupancy. The accepting states F are states at which an event is predicted.

In one example, transformation of a LSTM into a DFA is a simplified version of a network-abstraction model. In a basic transformation, network abstraction states are created based on the cell state $C_t$ and hidden state $h_t$ of the LSTM. The values of $C_t$ and $h_t$ are in the range (−1, 1) due to the use of tanh. Consider a partition of the range (−1, 1) into m parts, or partitions {(−1+i(2/m), −1+(i+1)(2/m)] |i=0, 1, . . . , m−1}. The discrete state of $C_t$ is a function that maps $C_t$ to the appropriate partition in the range per Equation 1:

$$\text{state}(C_t)=i \text{ iff} -1+i(2/m)<C_t \le -1+(i+1)(2/m) \qquad \text{Equation 1:}$$

Similarly, $h_t$ may be mapped to one of n partitions in the range (−1, 1) per Equation 2:

$$\text{state}(h_t)=j \text{ iff} -1+j(2/n)<h_t \le -1+(j+1)(2/n) \qquad \text{Equation 2:}$$

The states of the constructed automaton are Q={$q_{i,j}$|0≤i≤m and 0≤j≤n}, that is, all the m×n possible indexes of the partitions of the ranges of $C_t$ and $h_t$. The accepting states F are states $q_{ij}$ for which there is an event prediction for $h_t$ in the j-th range. The transition function δ is computed from the LSTM as follows. For each x∈Σ, and each state $q_{ij}$, the values of $C_t$ and $h_t$ are considered to be the midpoint of the partition i and j. The values $C_{t+1}$ and $h_{t+1}$ are computed by applying the LSTM equations of FIG. 3. The new state is according to the indexes of the new values. That is, δ($q_{ij}$, a)=$q_{i'j'}$ where i'=state($C_{t+1}$) and j'=state($h_{t+1}$) for Equation 3, such that LE is the application of the LSTM equations of FIG. 3 to compute $C_{t+1}$ and $h_{t+1}$:

$$[C_{t+1}, h_{t+1}]=LE(C_t=-1+i(1/m), h_t=-1+i(1/n), x_t=a) \qquad \text{Equation 3:}$$

The resulting automaton (DFA) has at most m·n states. Hence, the size of the DFA may be controlled by setting the number of partitions in the ranges. For instance, in one example, m and n may be selected according to the space allocated for P4 rules in the switch.

Figure 4:
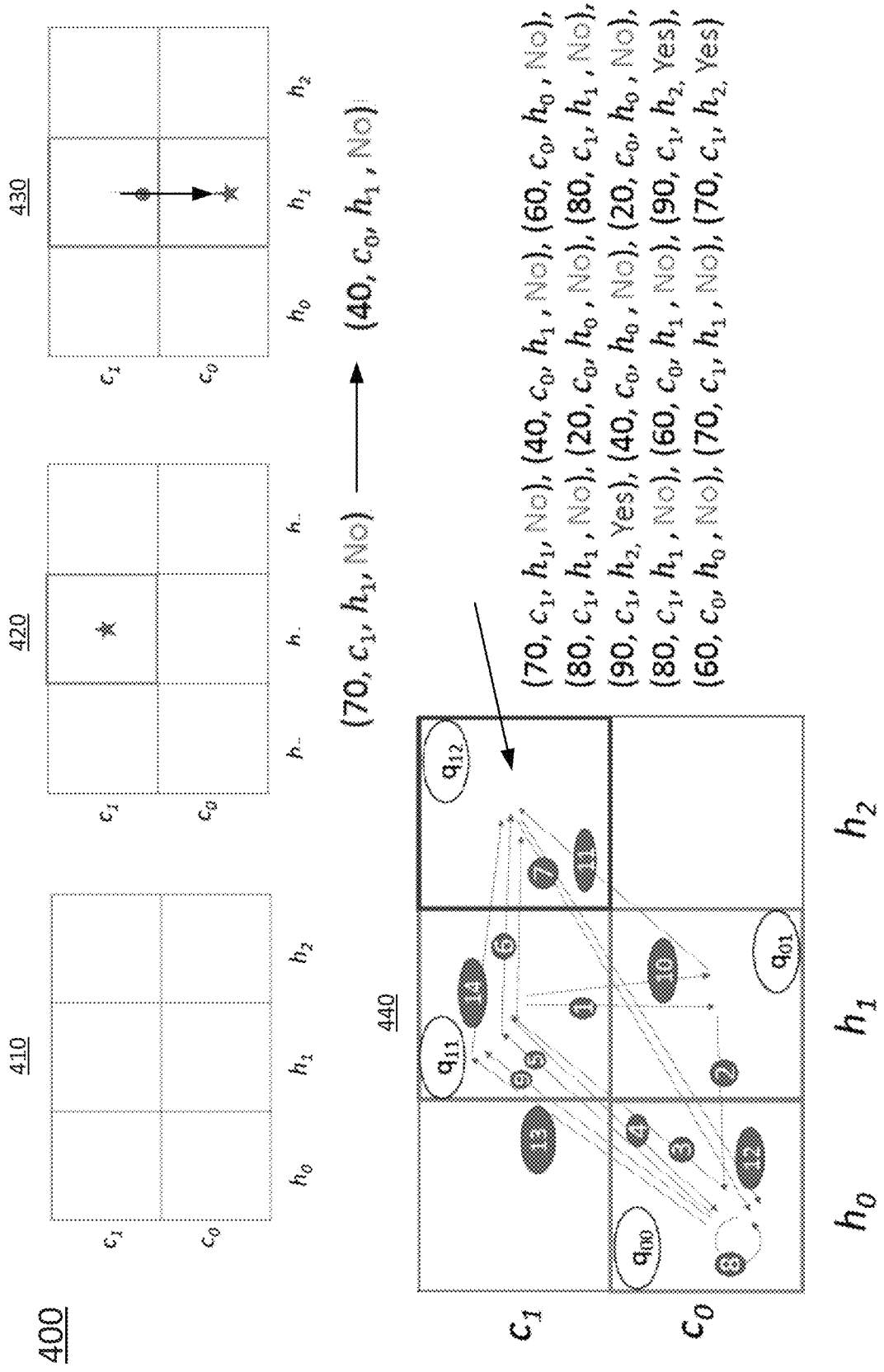
FIG. 4 illustrates a process of generating the network abstraction from a LSTM model in accordance with the present disclosure.

The example of FIG. 4 illustrates a process of generating the network abstraction 400. In particular, the example illustrated in FIG. 4 assumes that an ingress queue occupancy is measured and yields the following percentage values: 70, 40, 60, 80, 20, 80, 90, 40, 20, 80, 60, 90, 60, 70, 70. In addition, in the present example, there are two cell state value partitions $c_0$ and $c_1$, and three hidden state value partitions $h_0$, $h_1$, $h_2$, resulting from the respective range partitions. Continuing with the present example, assume that the following sequence S of 3-tuples $(x_t, c_t, h_t)$, where $x_t$ is the measured feature/measurement value at time t, and $c_t$ and $h_t$ are the cell state value partition and hidden state value partition at time t, respectively, and where tuples preceded by an E are the times when an event occurred: (70, c1, h1), (40, c0, h1), (60, c0, h0), (80, c1, h1), (20, c0, h0), (80, c1, h1), E(90, c1, h2), (40, c0, h0), (20, c0, h0), (80, c1, h1), (60, c0, h1), E(90, c1, h2), (60, c0, h0), (70, c1, h1), E(70, c1, h2). For the example of FIG. 4 it is also assumed that the alphabet Σ contains three elements: x≤30, 30<x<70 and x≥70. It should be noted that this is a simplification only for illustrative purposes.

FIG. 4 illustrates a process flow 400 based on the sequence S, in which a first phase 410 comprises creating an array where one dimension comprises the cell state value partitions (c-values) and the other comprises the hidden state value partitions (h-values). Since there are two state value partitions for $C_t$ and three state value partitions for $h_t$, based upon all possible combinations/pairs of cell state value partition and hidden state value partition, there are six network abstraction states, each representing a pair of a cell state value partition and a hidden state value partition.

Each two consecutive tuples in the sequence S form a transition or edge in the network abstraction, e.g., the first pairs correspond to the transition from (1, 1) to (0, 1). For instance, at phase 420 the network abstraction state is marked at (0, 1). Next, at phase 430, a transition/edge is added indicating the network abstraction state change to from (0, 1) to (1, 1). The same process is followed for each state change (e.g., each consecutive pair of tuples in the sequence S). The result for the full example sequence S is shown in phase 440. Note that in each case when an event occurred, the hidden state value partition was $h_2$.

Since there are six network abstraction states in the network abstraction, a DFA to be derived therefrom also has at most six potential states Q={$q_{00}$, $q_{01}$, $q_{02}$, $q_{10}$, $q_{11}$, $q_{12}$}. It should be noted that in the present example, not all of the potential states in Q are visited. The visited states of Q are further illustrated in phase 440 of FIG. 4. In addition, FIG. 5 illustrates in greater detail the transition from the network abstraction, such as shown in phase 440 of FIG. 4 to a DFA.

In particular, FIG. 5 illustrates a state machine representation 510 of the network abstraction of phase 440 of FIG. 4. The state machine representation 510 labels each of the visited network abstraction states as a respective DFA state from Q (e.g., $q_{00}$, $q_{01}$, $q_{11}$, $q_{12}$). In addition, all possible transitions among the DFA states are represented. However, it should be noted that where there are multiple transitions/edges between respective state pairs in a same direction, in one example, these are consolidated into a single transition/edge. For instance, the edge between $q_{11}$, $q_{12}$ is shared by the 6th and 14th transitions according to the sequence S. In addition, the state machine representation 510 is further enhanced to generate the resultant DFA 520 by consolidating elements from the alphabet Σ to indicate a rule for when to travel along a transition/edge from one DFA state to another along a given edge/transition. For instance, the DFA 520 illustrates a rule for traveling along the edge between $q_{11}$, $q_{12}$ that was shared by the 6th and 14th transitions according to the sequence S. For example, for all instances of being in state $q_{11}$ and x>70, the edge/transition is followed. Similarly, for all instances of being in state $q_{11}$ and 30<x<70 the edge/transition to $q_{01}$ is followed, e.g., according to the 1st and 10th transitions in the sequence S. Each of the additional edges/transitions in the DFA 520 is similarly assigned a rule (which may be a composite based upon the initial transitions/edges between the same network abstraction states in a same direction). A 5-tuple representation 530 of the DFA 520 is further illustrated in FIG. 5. The initial state is $q_0$={$q_{00}$}, the accepting state(s) is F={$q_{12}$}, and the transition function σ is in accordance with the edge rules depicted in the DFA 520.

In one example, if a constructed DFA is inconsistent with the LSTM model from which the DFA is derived, the processes of FIGS. 4 and 5 may be repeated with a finer level of range partitioning into cells. Alternatively, or in addition to discover the regions of the DFA, the input (e.g., the training/testing data) may be varied to explore the search space of partitions. However, such a process may not scale well. To address this issue, in one example, a refinement process is applied as follows. Given an LSTM, or some other recurrent neural network R, first, a DFA $A^{L*}$ is constructed using the L* algorithm. A second DFA $A^P$ is constructed for partition P using network abstraction, like the process 400 depicted in FIG. 4. Iteratively, the refinement process may look for a sequence (word over the alphabet Σ) that is accepted by one of the two automatons but not by the other. If such a sequence w is discovered, it is tested over the LSTM, to know which of the two DFAs misclassifies it. If $A^{L*}$ needs a refinement, new states are added to correctly classify w. If $A^P$ classifies w incorrectly, the partition P is refined by partitioning the cell to which w leads. When the DFAs agree on all tested sequences, $A^{L*}$ (or alternatively $A^P$) is returned. Note that the refinement process can be stopped when the size of the automaton reaches a predefined limit or after a given time limit.

To execute the prediction model in a switch, in accordance with the present disclosure the DFA A=(Q, Σ, δ, $q_0$, F) is translated/transformed into switch rules (e.g., P4 rules). In one example, the transformation creates two match-action tables—one for implementing the transition function δ and one for the finite state(s) F (the "accepting states"). FIG. 6 illustrates Algorithm 1 (610) to effect the transformation. For reference, the DFA of the preceding FIG. 5 is repeated in FIG. 6 as DFA 630 (e.g., in 5-tuple representation). Table $T_δ$ (620) implements the transitions between the states. For example, the rule (state=$q_{ij}$ && x, state=$q_{i'j'}$) in step 3 of Algorithm 1 is applied when the state is $q_{ij}$ and the input is x. The action is a change of the state to be $q_{i'j'}$. Hence, it implements a transition between the states for the input x∈Σ. Table $T^F$ (640) implements the action that is executed when an event is predicted. For instance, the action may be set by the network operator, such as dropping packets, rerouting packets, diverting packets to a different queue or buffer, instantiating a new virtual machine (VM) or virtual network function (VNF) (e.g., for offloading, load balancing, or the like), generating an alert to one or more other devices or processing systems of the network, notifying one or more network operations personnel, and so forth. The rule (state=$q_{ij}$, state=$q_0$ && action) in step 7 of Algorithm 1 is applied when the state $q_{ij}$ is in F. In this case, the defined action is executed and the state machine is transitioned into the initial state to restart the prediction process.

In one example, prediction errors can occur in the prediction model (e.g., the LSTM model) and in the transformations into a DFA and switch rules. Hence, it is useful to discover the sequences that lead to incorrect predictions. Once observed, such sequences can be used as counterexamples to refine the DFA or retrain the prediction model, to improve the accuracy. It should also be noted that in testing, examples of the present disclosure utilizing switch rules derived from LSTM models have higher precision, higher recall, an higher F1 scores than other ML-based models, such as random forest, while achieving comparable results to the parent LSTM models (e.g., with respect to at least predictions of microbursts, excessive link utilization, and high queue occupancy predictions). In particular, there may be no more than a six percent difference in F1 score of a rule set generated in accordance with the present disclosure as compared to the respective parent LSTM model. At the same time, training and retraining of the models of the present disclosure may be completed in minutes, while the resultant rule sets may be deployed and operate at line rate. Furthermore, it is found that high performing DFA models may use between approximately 750 and 6,250 rules when transformed into switch rules (e.g., P4 match-action rules). For instance, it may take approximately 3,000 rules to represent a DFA with 111 states, and approximately 3,700-6,100 rules to represent a DFA with 156 states. In addition, it is found that LSTM models with around 50 cells achieves very high accuracy (precision, recall, and F1 all greater than or equal to 0.94), although LSTMs with as few as 10 cells, or even a single cell may be deployed in accordance with the present disclosure. Nevertheless, even for LSTMs with around 50 cells, LSTM training and DFA generation may take no more than 20 minutes to train and four minutes to extract, respectively.

FIG. 7 illustrates an example flowchart of an example method 700 for generating a deterministic finite automaton based upon a prediction model and converting the deterministic finite automaton into a rule set for deployment to at least one network component. In one example, steps, functions, and/or operations of the method 700 may be performed by a device as illustrated in FIG. 1, e.g., one of servers 135, or by a component of the architecture 200 of FIG. 2, e.g., processing system 220. Alternatively, or in addition, the steps, functions and/or operations of the method 700 may be performed by a processing system collectively comprising a plurality of devices as illustrated in FIG. 1, such as one or more of server(s) 135, DB(s) 136, network component(s) 155, and so forth, or in FIG. 2, such as processing system 220 and switch 210, etc. In one example, the steps, functions, or operations of method 700 may be performed by a computing device or processing system, such as computing system 800 and/or a hardware processor element 802 as described in connection with FIG. 8 below. For instance, the computing system 800 may represent at least a portion of a platform, a server, a system, and so forth, in accordance with the present disclosure. In one example, the steps, functions, or operations of method 700 may be performed by a processing system comprising a plurality of such computing devices as represented by the computing system 800. For illustrative purposes, the method 700 is described in greater detail below in connection with an example performed by a processing system. The method 700 begins in step 705 and proceeds to step 710.

At step 710, the processing system obtains a time series of measurement values from a communication network. For instance, in one example, the time series of measurement values is obtained from at least one network component of the communication network, which may comprise at least one of: a switch, a router, a firewall, a border element, a gateway, a proxy, a SDN controller, etc. In one example, the at least one network component may be preconfigured to collect and transmit the measurement values to the processing system. Alternatively, or in addition, the processing system may request that the at least one network component begin collecting and/or transmitting the measurement values. In still another example, the processing system may obtain the measurement values from a database system of the communication network that is configured to collect and store measurement values from the at least one network component (e.g., in addition to storing measurement values from other network components and/or other types of data records). The time series of measurement values may include, for example, at least one of: a queue occupancy, a buffer occupancy, a port throughput, a processor utilization, a memory utilization, a link utilization, and so on.

At optional step 715, the processing system may obtain notifications of the instances of the event of interest, e.g., from the at least one network component of the communication network. In one example, the instances of the event of interest comprise instances of measurement values of the time series of measurement values exceeding a threshold, e.g., a buffer occupancy threshold is exceeded, a link utilization is exceeded, etc.

At optional step 720, the processing system may label the time series of measurement values with the indicators of the instances of the event of interest, in response to obtaining the notifications at optional step 715. It should be noted that in another example, the time series of measurement values may already include, comprise, or be accompanied by labels when obtained at step 710. For instance, the at least one network component may transmit the stream of measurement values with a label added for each detection of an event of interest.

At step 725, the processing system trains a prediction model in accordance with the time series of measurement values to predict future instances of the event of interest, where the time series of measurement values is labeled with one or more indicators of instances of the event of interest, e.g., some time series of measurement values may have indicators and some time series of measurement values may not have indicators. In one example, the event of interest may relate to a same metric as the time series of measurement values, e.g., predicting excessive queue occupancy based upon a time series of queue occupancy measurement values. In another example, the event of interest may relate to a different metric or a different set of measurement values, e.g., predicting link utilization exceeding a threshold based on queue occupancy metrics, or a link utilization exceeding a threshold based on queue occupancy and processor utilization metrics. In this regard, it should also be noted that the time series of measurement values may comprise vectors or sets of two or more measurement values for each element of the time series.

In one example, the prediction model comprises a recurrent neural network (RNN). For instance, the RNN may comprise a long short term memory (LSTM) model or a gated recurrent unit (GRU) model. For instance, the RNN may include a single cell or multiple cells, with weights gate functions learned via the training process (e.g., input, output, and forget gates). The training of the prediction model (e.g., an LSTM) at step 725 may include aspects described above in connection with the example of FIG. 3.

At step 730, the processing system generates a deterministic finite automaton (DFA) based upon the prediction model. In one example, step 730 comprises a network abstraction process. For example, step 730 may comprise aspects described above in connection with the example of FIG. 4. For instance, step 730 may include generating a network abstraction of the prediction model, where the network abstraction comprises a plurality of network abstraction states and a plurality of transitions between the network abstraction states. In one example, each network abstraction state of the plurality of network abstraction states represents a pair of a cell state value partition and a hidden state value partition, the cell state value partition being a partition of a range of values that a cell state of the prediction model may take, and the hidden state value partition being a partition of a range of values that a hidden state of the prediction model may take. For instance, the cell state value partition may comprise one of a plurality of cell state value partitions, where the plurality of cell state value partitions together comprise the range of values that the cell states of the prediction model may take. Similarly, the hidden state value partition is one of a plurality of hidden state value partitions, where the plurality of hidden state value partitions together comprise the range of values that the hidden states of the prediction model may take.

In one example, the number of partitions of each range may be selected based upon a desired accuracy of classification, a desired accuracy of matching the prediction model, a desired size of a resulting rule set, a constraint based upon a capability of at least one network component to which the resulting rule set is to be deployed, and so forth. In addition, each of the plurality of transitions may comprise a respective change between network abstraction states associated with respective consecutive measurement values in the time series of measurement values. It should be noted that a "change" can include "no change," which may conceptually comprise a change back to the same network abstraction state, and which can be illustrated as a loop back, such as shown as transition/edge 8 in phase 440 of FIG. 4. It should also be noted that in examples of RNN or other neural networks without cell states (e.g., only hidden states, such as for GRUs), then the network abstraction states may just represent hidden state value partitions, with the edges of the network abstraction being transitions between the hidden state value partitions.

In one example, the network abstraction process of step 730 further includes assigning each network abstraction state that is associated with at least one of the plurality of transitions as a respective state of a plurality of states the DFA, defining a plurality of transition functions, each of the plurality of transition functions associated with a respective transition of the plurality of transitions, and for at least one pair of the network abstraction states, consolidating at least two transition functions of the plurality of transition functions for at least two transitions between the pair of network abstraction states in a same direction. In addition, the DFA further comprises the plurality of transition functions after the consolidating (e.g., in the same or similar manner as illustrated in FIG. 5 and discussed above).

It should be noted that in another example, step 730 may comprise generating the DFA based upon the prediction model in accordance with an L* process/algorithm. In addition, in still another example, step 730 may comprise a refinement process where a DFA generated via the L* process/algorithm is verified against a DFA generated via a network abstraction process, and both DFAs are incrementally improved via verification against the prediction model. For example, such a verification process may include generating a first candidate DFA via an L* process/algorithm, generating a second candidate DFA via a network abstraction process, and applying a plurality of sequences to both the first candidate DFA and the second candidate DFA. Next, the processing system may detect at least one of the plurality of sequences that is accepted by one of the first candidate DFA or the second candidate DFA but not by the other, and apply the at least one of the plurality of sequences to the prediction model to determine which of the first candidate DFA or the second candidate DFA misclassifies the at least one of the plurality of sequences. The processing system may then either add additional states to the first candidate DFA when the first candidate DFA is determined to misclassify the at least one of the plurality of sequences or add additional network abstraction states to the second candidate DFA when the second candidate DFA is determined to misclassify the at least one of the plurality of sequences. Finally, the processing system may then select one of the first candidate DFA or the second candidate DFA as the DFA when the size of the one of the first candidate DFA or the second candidate DFA reaches a predefined limit or after a predefined time passes since a beginning of the applying of the plurality of sequences.

At step 735, the processing system converts the DFA into a rule set (e.g., a match-action rule set). In one example, step 735 may be in accordance with Algorithm 1 (610) of FIG. 6. For instance, step 735 may include generating a plurality of rules for the rule set, each rule of the plurality of rules comprising: a match to a measurement value of the time series of measurement values and an associated state of the plurality of states of the DFA and an action comprising changing a current state from the associated state to a next state of the plurality of states of the DFA in accordance with an associated transition function of the plurality of transition functions. In one example step 735 may further include generating at least one additional rule for the rule set, the at least one additional rule comprising a match to at least one accepting state of the plurality of states of the DFA, and an action comprising: recording a prediction of an additional instance of the event of interest and changing a current state from the at least one accepting state to an initial state of the plurality of states of the DFA.

At step 740, the processing system deploys the rule set to at least one network component of the communication network. For instance, the rule set may be deployed in at least one match-action table of the at least one network component of the communication network. For example, the match-action table(s) may be the same or similar to the example(s) illustrated in FIG. 6. The at least one network component may be the same as the at least one network component from which the time series of measurement values is obtained, or may be a different set of one or more network components.

At optional step 745, the processing system may detect at least one misclassification of at least one sequence via the rule set. In one example, the detecting may include receiving a notification of misclassification from the at least one network component at which the misclassification occurs.

At optional step 750, the processing system may apply the at least one sequence to the prediction model, e.g., to determine a prediction/classification over the sequence according to the prediction model.

At optional step 755, the processing system may select between: (1) when the prediction model (e.g., LSTM model)

misclassifies the at least one sequence in response to the applying of the at least one sequence to the prediction model, then retraining the prediction model, and (2) when the prediction model does not misclassify the at least one sequence in response to the applying the at least one sequence to the prediction model, increasing a number of the network abstraction states (and regenerating the network abstraction, DFA, and rule set).

Following step 740 or optional step 755, the method 700 ends in step 795.

It should be noted that method 700 may be expanded to include additional steps, or may be modified to replace steps with different steps, to combine steps, to omit steps, to perform steps in a different order, and so forth. For instance, in one example, the processing system may repeat one or more steps of the method 700, such as steps 710-745 for the same or a different one or more network components, for predicting a different type of network event, and so on. In one example, the method 700 may include obtaining instructions from a different processing system, network operations personnel devices, client/customer devices, etc. requesting that a rule set be generated for predicting a selected type of network event. In such case, the method 700 may also include obtaining training/testing data from such other entities, or being directed as to where and how to obtain such training/testing data. In one example, optional steps 745-755 may alternatively or additionally be performed as part of steps 725-735. In other words, steps 725-735 may be repeated to incrementally improve the DFA and the rule set based upon testing per optional steps 745-755. Thus, these and other modifications are all contemplated within the scope of the present disclosure.

In addition, although not specifically specified, one or more steps, functions, or operations of the method 700 may include a storing, displaying, and/or outputting step as required for a particular application. In other words, any data, records, fields, and/or intermediate results discussed in the method 700 can be stored, displayed and/or outputted either on the device(s) executing the method 700, or to another device or devices, as required for a particular application. Furthermore, steps, blocks, functions, or operations in FIG. 7 that recite a determining operation or involve a decision do not necessarily require that both branches of the determining operation be practiced. In other words, one of the branches of the determining operation can be deemed as an optional step. In addition, one or more steps, blocks, functions, or operations of the above described method 700 may comprise optional steps, or can be combined, separated, and/or performed in a different order from that described above, without departing from the examples of the present disclosure.

Figure 8:
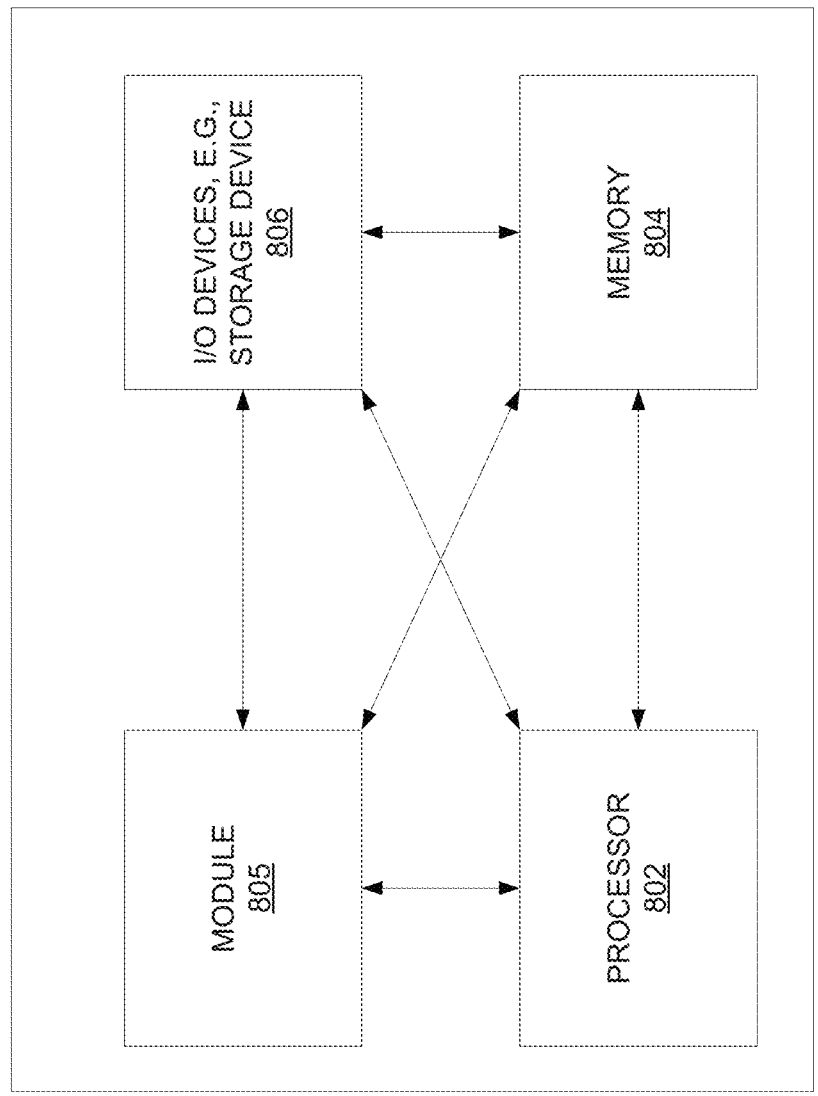
FIG. 8 illustrates a high-level block diagram of a computing device or system specially programmed to perform the functions described herein.

FIG. 8 depicts a high-level block diagram of a computing system 800 (e.g., a computing device, or processing system) specifically programmed to perform the functions described herein. For example, any one or more components or devices illustrated in FIG. 1, or described in connection with the examples of FIGS. 2-7 may be implemented as the computing system 800. As depicted in FIG. 8, the computing system 800 comprises a hardware processor element 802 (e.g., comprising one or more hardware processors, which may include one or more central processing units (CPUs) or microprocessors, one or more multi-core processors, one or more co-processors, such as a graphics processing unit (GPU), and so forth), where hardware processor element 802 may also represent one example of a "processing system" as referred to herein), a memory 804, (e.g., random access memory (RAM), read only memory (ROM), a disk drive, an optical drive, a magnetic drive, and/or a Universal Serial Bus (USB) drive), a module 805 for generating a deterministic finite automaton based upon a prediction model and converting the deterministic finite automaton into a rule set for deployment to at least one network component, and various input/output devices 806, e.g., a camera, a video camera, storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Although only one hardware processor element 802 is shown, it should be noted that the computing device may employ a plurality of hardware processor elements. Furthermore, although only one computing device is shown in FIG. 8, if the method(s) as discussed above is implemented in a distributed or parallel manner for a particular illustrative example, i.e., the steps of the above method(s) or process(es) or the entire method(s) or process(es) are implemented across multiple or parallel computing devices, e.g., a processing system, then the computing device of FIG. 8 is intended to represent each of those multiple computing devices. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented. The hardware processor element 802 can also be configured or programmed to cause other devices to perform one or more operations as discussed above. In other words, the hardware processor element 802 may serve the function of a central controller directing other devices to perform the one or more operations as discussed above.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computing device, or any other hardware equivalents, e.g., computer readable instructions pertaining to the method(s) discussed above can be used to configure a hardware processor to perform the steps, functions and/or operations of the above disclosed method(s). In one example, instructions and data for the present module or process 805 for generating a deterministic finite automaton based upon a prediction model and converting the deterministic finite automaton into a rule set for deployment to at least one network component (e.g., a software program comprising computer-executable instructions) can be loaded into memory 804 and executed by hardware processor element 802 to implement the steps, functions or operations as discussed above in connection with the example method(s). Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for generating a deterministic finite automaton based upon a prediction model and converting the deterministic finite automaton into a rule set for deployment to at least one network component (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not limitation. Thus, the breadth and scope of a preferred embodiment should not be limited by any of the above-described example embodiments, but should be defined only in accordance with the following claims and their equivalents.

What is claimed is:

1. A method comprising:
    obtaining, by a processing system including at least one processor, a time series of measurement values from a communication network;
    training, by the processing system, a prediction model in accordance with the time series of measurement values to predict future instances of an event of interest, wherein the time series of measurement values is labeled with one or more indicators of instances of the event of interest;
    generating, by the processing system, a deterministic finite automaton based upon the prediction model, wherein the generating the deterministic finite automaton based upon the prediction model comprises a network abstraction process, wherein the network abstraction process comprises generating a network abstraction of the prediction model, wherein the network abstraction comprises:
        a plurality of network abstraction states, wherein each network abstraction state of the plurality of network abstraction states represents a pair of a cell state value partition and a hidden state value partition, the cell state value partition being a partition of a range of values that cell states of the prediction model may take, and the hidden state value partition being a partition of a range of values that hidden states of the prediction model may take; and
        a plurality of transitions between the plurality of network abstraction states;
    converting, by the processing system, the deterministic finite automaton into a rule set; and
    deploying, by the processing system, the rule set to at least one network component of the communication network.

2. The method of claim 1, wherein the prediction model comprises a recurrent neural network.

3. The method of claim 2, wherein the recurrent neural network comprises one of:
    a long short term memory model; or
    a gated recurrent unit model.

4. The method of claim 1, further comprising:
    obtaining notifications of the instances of the event of interest; and
    labeling the time series of measurement values with the indicators of the instances of the event of interest, in response to the obtaining the notifications.

5. The method of claim 1, further comprising:
    detecting at least one misclassification of at least one sequence via the rule set;
    applying the at least one sequence to the prediction model; and
    selecting between:
        when the prediction model misclassifies the at least one sequence in response to the applying the at least one sequence to the prediction model, then retraining the prediction model; and
        when the prediction model does not misclassify the at least one sequence in response to the applying the at least one sequence to the prediction model, increasing a number of the plurality of network abstraction states.

6. The method of claim 1, wherein the cell state value partition is one of a plurality of cell state value partitions, wherein the plurality of cell state value partitions together comprise the range of values that the cell states of the prediction model may take, wherein the hidden state value partition is one of a plurality of hidden state value partitions, wherein the plurality of hidden state value partitions together comprise the range of values that the hidden states of the prediction model may take.

7. The method of claim 1, wherein each of the plurality of transitions comprises a respective change between network abstraction states associated with respective consecutive measurement values in the time series of measurement values.

8. The method of claim 7, wherein the network abstraction process further comprises:
    assigning each network abstraction state that is associated with at least one of the plurality of transitions as a respective state of a plurality of states of the deterministic finite automaton;
    defining a plurality of transition functions, each of the plurality of transition functions associated with a respective transition of the plurality of transitions; and
    for at least one pair of the network abstraction states, consolidating at least two transition functions of the plurality of transition functions for at least two transitions between the pair of network abstraction states in a same direction, wherein the deterministic finite automaton further comprises the plurality of transition functions after the consolidating.

9. The method of claim 8, wherein the converting the deterministic finite automaton into the rule set comprises:
    generating a plurality of rules for the rule set, each rule of the plurality of rules comprising:
        a match to a measurement value of the time series of measurement values and an associated state of the plurality of states of the deterministic finite automaton; and
        an action comprising changing a current state from the associated state to a next state of the plurality of states of the deterministic finite automaton in accordance with an associated transition function of the plurality of transition functions.

10. The method of claim 9, wherein the converting the deterministic finite automaton into the rule set further comprises:
    generating at least one additional rule for the rule set, the at least one additional rule comprising:

a match to at least one accepting state of the plurality of states of the deterministic finite automaton; and
an action comprising:
recording a prediction of an additional instance of the event of interest; and
changing a current state from the at least one accepting state to an initial state of the plurality of states of the deterministic finite automaton.

11. The method of claim 1, wherein the rule set is deployed in at least one match-action table of the at least one network component of the communication network.

12. The method of claim 1, wherein the at least one network component comprises one of:
a switch;
a router;
a firewall;
a border element;
a gateway; or
a proxy.

13. The method of claim 1, wherein the generating the deterministic finite automaton based upon the prediction model is via an L* algorithm.

14. The method of claim 1, wherein the generating the deterministic finite automaton based upon the prediction model comprises:
generating a first candidate deterministic finite automaton via an L* algorithm;
generating a second candidate deterministic finite automaton via a network abstraction process;
applying a plurality of sequences to both the first candidate deterministic finite automaton and the second candidate deterministic finite automaton;
detecting at least one of the plurality of sequences that is accepted by one of the first candidate deterministic finite automaton or the second candidate deterministic finite automaton but not by the other;
applying the at least one of the plurality of sequences to the prediction model to determine which of the first candidate deterministic finite automaton or the second candidate deterministic finite automaton misclassifies the at least one of the plurality of sequences;
performing at least one of:
adding additional states to the first candidate deterministic finite automaton when the first candidate deterministic finite automaton is determined to misclassify the at least one of the plurality of sequences; or
adding additional network abstraction states to the second candidate deterministic finite automaton when the second candidate deterministic finite automaton is determined to misclassify the at least one of the plurality of sequences; and
selecting one of the first candidate deterministic finite automaton or the second candidate deterministic finite automaton as the deterministic finite automaton when a size of the one of the first candidate deterministic finite automaton or the second candidate deterministic finite automaton reaches a predefined limit or after a predefined time passes since a beginning of the applying of the plurality of sequences.

15. The method of claim 1, wherein the instances of the event of interest comprise instances of measurement values of the time series of measurement values exceeding a threshold, wherein the time series of measurement values comprises measurement values of at least one of:
a queue occupancy;
a buffer occupancy;
a port throughput;
a processor utilization;
a memory utilization; or
a link utilization.

16. A non-transitory computer-readable medium storing instructions which, when executed by a processing system including at least one processor, cause the processing system to perform operations, the operations comprising:
obtaining a time series of measurement values from a communication network;
training a prediction model in accordance with the time series of measurement values to predict future instances of an event of interest, wherein the time series of measurement values is labeled with one or more indicators of instances of the event of interest;
generating a deterministic finite automaton based upon the prediction model, wherein the generating the deterministic finite automaton based upon the prediction model comprises a network abstraction process, wherein the network abstraction process comprises generating a network abstraction of the prediction model, wherein the network abstraction comprises:
a plurality of network abstraction states, wherein each network abstraction state of the plurality of network abstraction states represents a pair of a cell state value partition and a hidden state value partition, the cell state value partition being a partition of a range of values that cell states of the prediction model may take, and the hidden state value partition being a partition of a range of values that hidden states of the prediction model may take; and
a plurality of transitions between the plurality of network abstraction states;
converting the deterministic finite automaton into a rule set; and
deploying the rule set to at least one network component of the communication network.

17. An apparatus comprising:
a processing system including at least one processor; and
a non-transitory computer-readable medium storing instructions which, when executed by the processing system, cause the processing system to perform operations, the operations comprising:
obtaining a time series of measurement values from a communication network;
training a prediction model in accordance with the time series of measurement values to predict future instances of an event of interest, wherein the time series of measurement values is labeled with one or more indicators of instances of the event of interest;
generating a deterministic finite automaton based upon the prediction model, wherein the generating the deterministic finite automaton based upon the prediction model comprises a network abstraction process, wherein the network abstraction process comprises generating a network abstraction of the prediction model, wherein the network abstraction comprises:
a plurality of network abstraction states, wherein each network abstraction state of the plurality of network abstraction states represents a pair of a cell state value partition and a hidden state value partition, the cell state value partition being a partition of a range of values that cell states of the prediction model may take, and the hidden state value partition being a partition of a range of values that hidden states of the prediction model may take; and a plurality of transitions between the plurality of network abstraction states;

converting the deterministic finite automaton into a rule set; and deploying the rule set to at least one network component of the communication network.

18. The apparatus of claim 17, wherein the prediction model comprises a recurrent neural network.

19. The apparatus of claim 18, wherein the recurrent neural network comprises one of:

a long short term memory model; or a gated recurrent unit model.

20. The apparatus of claim 17, wherein the operations further comprise:

obtaining notifications of the instances of the event of interest; and labeling the time series of measurement values with the indicators of the instances of the event of interest, in response to the obtaining the notifications.

\* \* \* \* \*

UNITED STATES PATENT AND TRADEMARK OFFICE
CERTIFICATE OF CORRECTION

PATENT NO. : 11,669,751 B2
APPLICATION NO. : 17/105971
DATED : June 6, 2023
INVENTOR(S) : Yaron Kanza et al.

It is certified that error appears in the above-identified patent and that said Letters Patent is hereby corrected as shown below:

On the Title Page

Column 1 (72) Inventors, Line 5, before "Yu" delete "Minian" and insert --Minlan--, therefor.

Column 1 (73) Assignees, Line 5, after "UNIVERSITY OF" delete "SOUTHER" and insert --SOUTHERN--, therefor.

Signed and Sealed this
Eighteenth Day of July, 2023

Katherine Kelly Vidal
*Director of the United States Patent and Trademark Office*